March 25, 1969     R. BRUNNER     3,434,344

SWIRL METER

Filed June 14, 1966

INVENTOR
Richard Brunner

BY    *Eli Weiss*

ATTORNEY

United States Patent Office 3,434,344
Patented Mar. 25, 1969

3,434,344
SWIRL METER
Richard Brunner, New Brunswick, N.J., assignor to American Standard Inc., a corporation of Delaware
Filed June 14, 1966, Ser. No. 557,490
Int. Cl. G01f 1/00
U.S. Cl. 73—194                                         8 Claims

ABSTRACT OF THE DISCLOSURE

A conductor having an inlet and outlet for flowing fluid is provided with a series of blades which induce fluid flowing therethrough to swirl. The conductor is also provided with a second member positioned downstream of the swirl blades for inducing an instability in the swirling fluid, whereby the swirling fluid is caused to precess by rotation of its swirl axis about the central axis of fluid flow through the conductor. Such instability inducing means may be a bullet-shaped member or a high pressure conduit facing the swirl blades or a low pressure conduit facing away from the swirl blades, and a sensor is included for measuring the frequency of precession which is linearly correlated with the mean flow rate of the fluid through the conductor. Accordingly, the apparatus is useful as a flow meter.

---

The invention pertains to the measuring of parameters of flowing fluids and more particularly to a swirl flow type of measuring device.

In the swirl flow type of measuring devices, the fluid whose parameters are to be measured is first forced to assume a swirl component by converting pressure energy into kinetic energy. The swirling fluid is then induced into a particular kind of hydrodynamic instability which causes the low pressure center of the swirling fluid to precess at a discrete frequency about the flow centerline, i.e., if the center of the swirling flow were made visible by suitable means it would be observed to trace out a conical shape.

This precession shall here be referred to as swirl precession. The rate of precession or the rate at which the center of the swirl flow rotates about the center of the flow (flow axis) is, in certain cases, directly proportional to the mean flow rate of the fluid. In other cases, the time integral of the frequency indicates the total volumetric flow. And in further cases, the density and viscosity parameters of the fluid are related to the frequency of the swirl precession. A suitable sensor means in the fluid can detect the cycling of the swirl precession and can be made to transmit a signal to a device which can then indicate the desired parameter.

In the copending application Ser. No. 316,640, now U.S. Patent No. 3,279,251, filed Oct. 16, 1963, and assigned to the same assignee, the swirl precession is created by feeding the swirling fluid from a conduit of one cross-sectional area to a conduit of enlarged cross-sectional area. While such a device admirably creates the desired swirl precession, it has stimulated the demand for even better devices, particularly to minimize the pressure loss incurred.

It is, accordingly, an object of the invention to provide improvements in the above mentioned swirl flow type measuring devices.

Briefly, the invention contemplates forcing the fluid flowing in a conductor to assume a swirl condition and of inducing in the swirling fluid an instability having the characteristic of a backflow. Such an instability causes the swirling fluid to precess about the flow axis. Sensing means then sense the frequency of the precession. The swirl precession frequency can then be utilized to indicate such fluid parameters as flow rate, volume of flow, density of the fluid and viscosity of the fluid.

Other objects, the features and advantages of the invention will be apparent from the following description, when read with the accompanying drawing which show, by way of example and not limitation, different embodiments of apparatus for practicing the invention.

Figure 4:
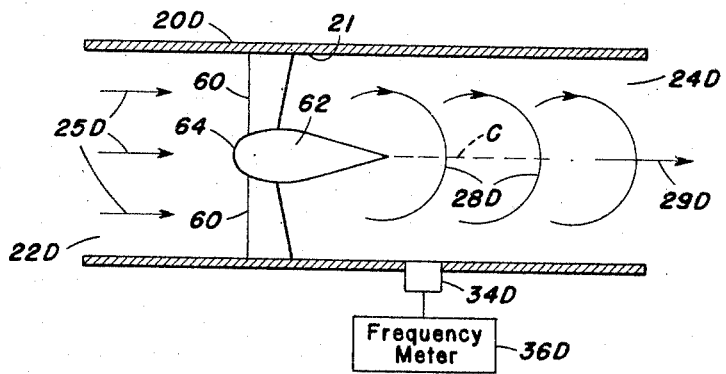
Figure 5:
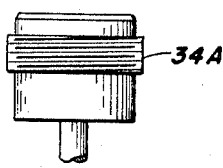

In the drawing:
FIGURES 1 to 4 shows cross-sectional views, partially in schematic, of various embodiments of structure in accordance with the principles of the invention; and
FIGURE 5 illustrates a sensor means which can be used with the structure of this invention.

Each of the embodiments employs many of the same types of elements. Accordingly, whenever an element is the same for each embodiment the same reference numeral will be employed. However, the reference numeral will have a different suffix letter designation for each embodiment. Where the same element is used in each of the embodiments it will only be described with respect to FIGURE 1.

Figure 1:
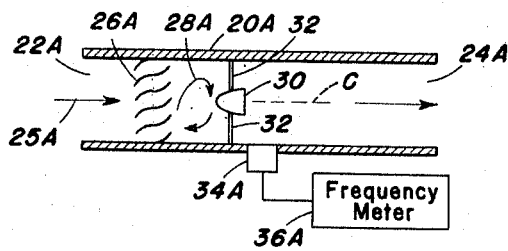

With reference to FIGURE 1, there is illustrated structure in accordance with the principles of this invention. A fluid conductor means 20A has an inlet 22A for receiving the fluid whose parameters are to be measured and an outlet 24A. Fluid entering fluid conductor means 20A is indicated by arrow 25A. The fluid has a flow axis C which is colinear with the axis of the fluid conductor means 20A. Downstream of inlet 22A are swirl means 26A within the fluid conductor means 20A, or convolutions positioned within the interior surface of the conductor means 20A or vanes positioned across the interior surface of the conductor means 20A. It has been found that the linearity of this device is determined by the design of the swirl means. For example, a linear device is obtained if fixed blades with a given exit angle with respect to the conductor axis are used. The swirling fluid is indicated by arrows 28A.

In order to induce the fluid instability having the characteristic of a local backflow which results in the precession of the swirling fluid, there is disposed an obstruction 30 downstream of swirl means 26A. Obstruction 30 can be a bullet shaped member disposed along axis C and equispaced from the inner wall of conductor means 20A by struts 32. The head of the member faces swirl means 26A.

Sensor means 34A is positioned to best detect the cycling or frequency of the swirl precession. The sensor means 34A is screwed into the conductor 20A with its face in contact with the swirl precessing fluid. Since the swirling flow is precessing there are velocity, pressure and temperature fluctuations present in the flow. Therefore, there are several methods by which the frequency of the swirl precession can be detected. A pressure sensitive means shown in FIGURE 6 such as a diaphragm pressure transducer or piezoelectric crystal or the like can be utilized to measure the fluctuations of pressure; a velocity sensitive means such as a hot film anemometer or a hot wire anemometer or the like can be utilized to measure the fluctuations of velocity; or a temperature sensitive means such as a thermocouple or the like can be utilized to measure the fluctuations of temperature.

In operation, the fluid whose flow rate, for example, is to be determined, is fed to the inlet 22A of fluid conductor means 20A and exits from the outlet 24A thereof as indicated by arrow 29A. Swirl means 26A forces the fluid, which can be either gas or liquid, into a swirl condition. The presence of the obstruction 30 which the fluid encounters as it flows beyond swirl means 26A causes the swirling fluid to become unstable or, in other words, the center or axis of the swirling fluid traces a cone. The greater the rate of flow of the fluid, the greater the frequency at which the axis of the swirling fluid precesses.

Now, to determine the rate of flow, a frequency meter 36A is fed by the sensor means 34A to register the occurrence of each cycle, usually in cycles per second. Thus, the frequency meter will indicate the instantaneous rate of flow. If the frequency meter feeds a totalizer the totalizer will indicate the total flow during a specific interval.

Figure 2:
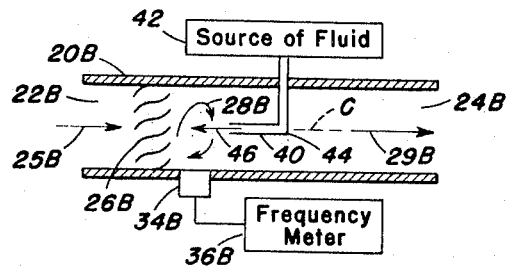

In FIGURE 2, the only difference resides in the apparatus which creates the instability. This apparatus comprises a conduit 40 fed fluid under pressure from source of fluid 42 via conduit 44. The fluid 46 is expelled from conduit 40 toward swirl means 26B.

Figure 3:
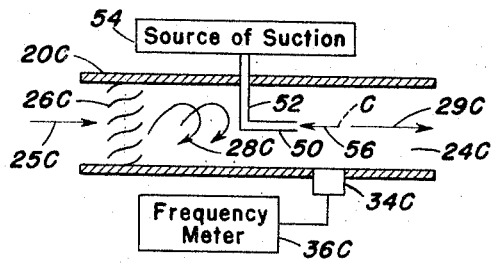

In FIGURE 3, the apparatus which creates the instability is a conduit conected via a conduit 52 to a source of suction 54. The conduit 50 faces in the downstream direction of fluid flow and draws fluid from the stream as indicated by arrow 56. In the embodiments of FIGURES 2 and 3, the conduits are preferably located on the flow axis C.

For the three embodiments described so far, the swirl means and the instability inducing means are longitudinally separated from each other. It is also possible and preferable to incorporate both of the means in a single structure. FIGURE 4 shows such a configuration. The swirl means includes a plurality of vanes 60 extending radially inward from the inner wall 21 of conductor 20D. Vanes 60 are so contoured to force the fluid moving over them into a swirling motion. The ends of the vanes 60 remote from inner wall 21 support a member 62 which induces the instability. The head 64 of member 62 faces the inlet 22D.

There has thus been shown several embodiments of a device for causing a fluid to assume a swirl precession while passing through a conductor. The frequency of the precession can be used to measure parameters of the fluid such as rate of flow, total volume, viscosity and density. The swirl precession is accomplished by forcing the fluid to assume a swirling motion and inducing in the swirling fluid an instability having the characteristic of a backflow which results in the swirling fluid precessing.

Obviously many modifications and variations of the present invention are possible in the light of the above teachings. It is, therefore, to be understood that within the scope of the appended claims the invention may be practiced otherwise than as specifically described.

What is claimed is:
1. A device sensitive to the flow of fluid comprising a fluid conductor means having an inner wall, an inlet and an outlet, so that fluid can flow from said inlet to said outlet, swirl means downstream of said inlet for urging a fluid flowing through said fluid conductor to assume a swirl condition, instability inducing means disposed along the flow axis of the swirling fluid for inducing an instability having the characteristic of a backflow in the swirling fluid whereby the swirling fluid precesses about the flow axis, said fluid conductor means having a substantially uniform cross-section from a position at least immediately upstream of said swirl means to a position at least immediately downstream of said instability inducing means, and sensing means disposed downstream of said swirl means for sensing the frequency of the precession.

2. The device of claim 1 wherein said instability inducing means is a member having symmetry about the flow axis and spaced from the inner wall of said fluid conductor means, said member being disposed downstream of said swirl means.

3. The device of claim 2 wherein said instability inducing means has a fluid dynamic contoured surface facing said swirl means.

4. The device of claim 3 wherein said instability inducing means is bullet shaped.

5. The device of claim 1 wherein said instability inducing means includes a conduit downstream of said swirl means and facing toward said swirl means, and means for applying pressure through said conduit to said swirling fluid.

6. The device of claim 1 wherein said instability inducing includes a conduit downstream of said swirl means and facing away from said swirl means, and means for applying suction to said conduit.

7. The device of claim 1 wherein said swirl means is a plurality of vanes extending inward from the inner wall of said fluid conductor means.

8. The device of claim 7 wherein said instability inducing means is a member on the flow axis of the fluid in the region of convergence of said vanes.

References Cited

UNITED STATES PATENTS

| 2,794,341 | 6/1957 | Vonnegut. |
|---|---|---|
| 3,116,639 | 1/1964 | Bird. |
| 3,279,251 | 10/1966 | Chanaud. |

FOREIGN PATENTS

| 148,254 | 9/1962 | U.S.S.R. |

OTHER REFERENCES

Rodely et al.: "A Digital Flowmeter Without Moving Parts," ASME Publication, 65–WA/FM–6, presented November 1965, pp. 1–8.

JAMES A. GILL, *Primary Examiner.*

E. D. GILHOOLY, *Assistant Examiner.*